United States Patent

Gilai (Goudsmit)

[11] Patent Number: 6,101,245
[45] Date of Patent: Aug. 8, 2000

[54] DIAL VERIFIER, ESPECIALLY FOR FACSIMILE TRANSMISSION

[76] Inventor: David Joseph Gilai (Goudsmit), 47 Mendes Street, Ramat-Gan, Israel, 52653

[21] Appl. No.: 09/292,259

[22] Filed: Apr. 15, 1999

[30] Foreign Application Priority Data

Apr. 8, 1999 [IL] Israel ......................................... 129372

[51] Int. Cl.[7] ............................................... H04M 11/00
[52] U.S. Cl. ...................................... 379/100.14; 216/355
[58] Field of Search ........................ 379/100.14, 100.17, 379/90.01, 355, 356, 283, 361, 418, 216, 100.01; 358/400, 440

[56] References Cited

U.S. PATENT DOCUMENTS 5,357,245 10/1994 Hagiwara .
5,452,099 9/1995 Von Meister .
5,812,657 9/1998 Reding et al. ........................... 379/216

FOREIGN PATENT DOCUMENTS

| | | | |
|---|---|---|---|
| 360009257A | 1/1985 | Japan | H04M 1/26 |
| 401209849A | 8/1989 | Japan | H04M 1/56 |
| 407111526A | 4/1995 | Japan | H04M 1/56 |
| 409321893A | 12/1997 | Japan | H04M 1/50 |

*Primary Examiner*—Curtis A. Kuntz
*Assistant Examiner*—Melur Ramakrishnaiah
*Attorney, Agent, or Firm*—Shalom Wertsberger; Saltamar Innovations

[57] ABSTRACT

An apparatus and method for preventing misdialing of a telephone number, especially fit for facsimile transmission is provided. The invention operates by dialing precompiled control keys added to the telephone number. The control keys are compared against computed control keys and transmission is allowed or denied according to the match between the dialed and computed control keys. The invention may be implemented in software embedded within the dialing device, in a telephone switch, telephony router, or by a special apparatus inserted anywhere in the transmission path.

38 Claims, 6 Drawing Sheets

DIAL VERIFIER, ESPECIALLY FOR FACSIMILE TRANSMISSION

TECHNICAL FIELD OF THE INVENTION

This invention relates to the verification of connection through communication switching in general, and to the prevention of wrong telephone dials in particular, especially with regard to facsimile and data signal transmissions.

BACKGROUND ART

The widespread usage of electronic telecommunication signaling and data processing devices such as facsimile, modems and similar apparatus, inevitably involves more and more transmissions which contain confidential and private information. Such transmissions are aimed to the specific recipient or communicant only. A misdialed transmission might end up with an empty handed recipient, and the disclosure of sensitive information to the wrong person may lead to substantial damage. Nowadays, the transmission of a facsimile or computer generated transmission carrying sensitive information, is burdened with the uncertainty that the dial number was erroneously dialed to a wrong recipient.

There have been attempts—in the prior art—to address the issue of preventing facsimiles from arriving at wrong recipients. One such attempt is disclosed in U.S. Pat. No. 5,357,245 issued to Hagiwara, entitled "Communicant Verifier". Hagiwara makes use of a memory part that memorizes a list of approved communicants, and a comparison part, that—after a number was dialed, searches the memory to find an identical number. If such a number is found, the transmission is continued, otherwise it is terminated. However, the Hagiwara patent suffers from an apparent drawback. It enables easy access and protection only to facsimile transmissions that are sent to a recipient who is already listed properly in the memory. If the user desires to send a facsimile to an occasional unlisted recipient, as is common when using facsimiles and modems, the user should store the number as a listed number in the memory part, and then dial the number again to enable the transmission. After the transmission is completed, the user may either leave such occasional number at the expense of the memory storage—adding unnecessary data there into, or bother to delete the number from the memory part. In addition, when the number is entered wrongly into the listed memory, this will disable future attempts to send a transmission that was dialed properly. Obviously, such an operation is cumbersome and it is likely that most users would resort to bypassing the protection altogether—and so rendering the protection useless.

Another attempt is disclosed in U.S. Pat. No. 5,452,099 issued to Von Meister, entitled "Method and System for Storage and/or Transmission of Confidential Facsimile Documents". The Von Meister Patent is based on sending facsimiles to a central store and forward facility instead of direct transmission to the recipient. The central store and forward facility possesses some kind of safety means, allowing the recipient to retrieve the facsimile only by dialing to the central store and forward facility and adding a security code which is attached to the facsimile, and was agreed upon in the first place between the recipient and the sender. Such a method, although seemingly appears to be very secure, also suffers from drawbacks that limit its use or make it gravely inconvenient. Firstly, only a recipient that is subscribed to this security system, may receive secured facsimiles. Secondly, erroneous dials are made by the sender, and therefore such system is more likely to protect the sender rather than the recipient from misdials. Thirdly, such a method does not allow facsimile transmissions to be conducted in a simple way as people are used to. It requires numerous additional operations, such as, the coordination of a security code to be made known to both the sender and the recipient, the attaching of the security code to the facsimile transmission, the contacting of the recipient in order to inform him of the transmission, and finally the recipient is required to retrieve the facsimile from the system by himself. Fourthly, if the sender dials a wrong number or does not have the right code, the facsimile may reside forever in some system beyond the control of the sender or recipient, the system is unable to get rid of the facsimile, and the true recipient is unable to locate his lost transmission.

There is thus a widely recognized need for, and it would be highly advantageous to have, a method and system for effectively securing the facsimile transmissions through dialing systems against wrong dials, without the need for adding excessive operations to the single dialing process, and without imposing coordination operations between the recipient, the sender or some intermediate element.

It is therefore an object of this invention to provide a method and a system for verifying a correct dial without the disadvantages entailed with the prior art.

Further objectives of this invention are to provide a method and a system for verifying a correct dial whereby the system is efficient at the time of the usual connection dial, reliable against most common misdials, easy to implement or apply by unskilled personnel, adapted to couple to or use with conventional facsimile machines, modems, telephones, telecommunication and switching apparatus, successfully reliable through misdials or when insecure transmission is sought without causing any damage or obstruction to the orderly operation of the system, requires minimal manufacturing operations and little maintenance if any, universally applicable regionally, nationwide or worldwide, and that may be standardized to be virtually applied to any dial.

In particular, it is an object of this invention to provide either a unitary assembly or software or prescription that can be sold in kit form and assembled or applied, respectively, as an add-on module or step by an unskilled householder or personnel using normal structure and assembly of the telephone, facsimile, modem, computer or any other dial communication device.

Yet, another object of this invention is to provide users with simple access to the facsimile machines or their equivalent, without requiring manipulation through instruction menus each time a facsimile transmission needs to be protected.

Still, a further object of this invention is to provide an adequate response to the need for prevention of most common errors, namely, incidental typing errors or erroneous retrieval of the right dial keys. Such typing errors may include striking a wrong dial key or interchanging two dial keys. Erroneous retrievals often occur when a dial series of keys, such as of a fax accession number, is given orally over the telephone, and the recipient misunderstands part of it.

These and other objects will become more apparent when viewed in light of the accompanying drawings and following detailed description.

SUMMARY OF THE INVENTION

In its broadest aspects the present invention comprises an apparatus and method for manipulating the series of keys to be dialed, typically a dial number comprised of digits, in a way that the misdialing of the series or number will be identified automatically on completion of the dialing process, and the transmission will be aborted before any information is transmitted.

According to one embodiment of the invention, each series of dial keys, i.e.—the telephone number, is augmented by one or two control keys or digits, which are unique functions of the digits or keys that comprise the original dial series or number. Preferably, the control key(s) or digit(s) are located in a predetermined location, e.g.—before the first key/digit or after the last one, so that the control key(s) or digit(s) are identified as such and so distinguished from the original dial series/number. Alternatively, the control key(s) may be distinguished by means of their being different in character(s) from those that may be included in the original dial series.

According to a unique feature of the invention, at some point along the route between the sender and the recipient, the dialed number is intercepted. The interception may be at the telephone switch, at the facsimile machine itself, or at a device inserted between the senders machine and the communication line wall plug. When the dialed number is intercepted, the control key(s)/digit(s) are extracted from the dialed sequence, and recomputed from the rest of the dial series/number. This may be done by using the same formula as the one that generated the control key(s)/digit(s) that were actually dialed. The computed control key(s) are then compared to the actually dialed control key(s)/digit(s) and the outcome is "match" or "no match". According to the outcome, a decision may be taken: if the computed and dialed control digits match—the transmission process is continued; if not, the transmission is aborted and the mismatch may be brought to the attention of the sender to decide whether to correct the error or continue anyway.

The degree of security provided by the present invention, depends on the set of errors towards which the method is aimed to detect. An undisputed presumption is that common dialing errors include misdialing of a single key/digit or the interchanging of two, usually proximate, keys/digits. It will be appreciated by those vested in the theory of error correcting codes that the more numbers included in the protecting code, the more error types may be prevented. Such approach may well suit computerized communication systems, where all types of errors are likely to occur with equal probability. Nevertheless, in telephony dialing, it will be appreciated that it is sufficient to provide appropriate protection against the above mentioned, most common, errors only, at the cost of adding a single key/digit as an "error detecting code" or control keys(s) (hereinafter—Control Key(s)). It is believed that such an error detecting code provides for the detection of any misdialed telephone number due to either a single wrong digit, or the interchange of any two digits, save one relatively negligible restriction, with 100% confidence. The method is also capable of detecting any two or more dialing errors, with a probability of nearly 90%.

It will be appreciated that the algorithm for computing Control Key(s) is by no means restricted to the detection of a single error only. It may be anticipated that a demand for protection against more than one error in a single dial might be required. Thus, the invention also includes an algorithm that provides full protection against one or two dialing errors or the interchange of two proximate digits, and adequate protection—with about 99% confidence—against any further error. For instance, if the sender misses all three digits of the area code in a facsimile sent within the U.S., there is less than a 1% probability that the error will not be detected. The "price" required for such broadened protection is the addition of a second control key to the first one.

Further features and advantages of the invention will be apparent from the description below, given by way of example only.

BRIEF DESCRIPTION OF THE DRAWINGS

The present invention will be further understood and appreciated from the following detailed description, taken in conjunction with the following enclosed drawings in which like numerals designate correspondingly analogous elements or sections throughout, and in which.

DETAILED DESCRIPTION OF THE INVENTION

The incentive behind the present invention is based on two observations. Firstly, people require simple access to their facsimile machines (herein below—"fax"), and do not like to manipulate through instruction menus each time they need to protect a fax transmission. Secondly, frequent errors are a result of incidental typing or dialing errors, such as entering a wrong digit or interchanging two digits. Errors also occur often when a fax dialing number is given orally over the telephone by the recipient to the sender, and the sender misunderstands part of it. The present invention aims to provide a response to the need to eliminate such errors, by providing adequate protection against the common dialing errors without impairing the simplicity of the dialing operations.

It will be appreciated by those skilled in the art that the invention is not limited to faxes—although it is primarily addressed to solve the problem of sending fax transmissions to the wrong recipient. The invention is and may well be applicable, with obvious adaptations, to any "dial" oriented communication activity, including regular telephone conversations, dial through modems, any computerized, signal or other data transmissions, any telecommunication dials, including "internet" addresses, and so forth.

Figure 1:
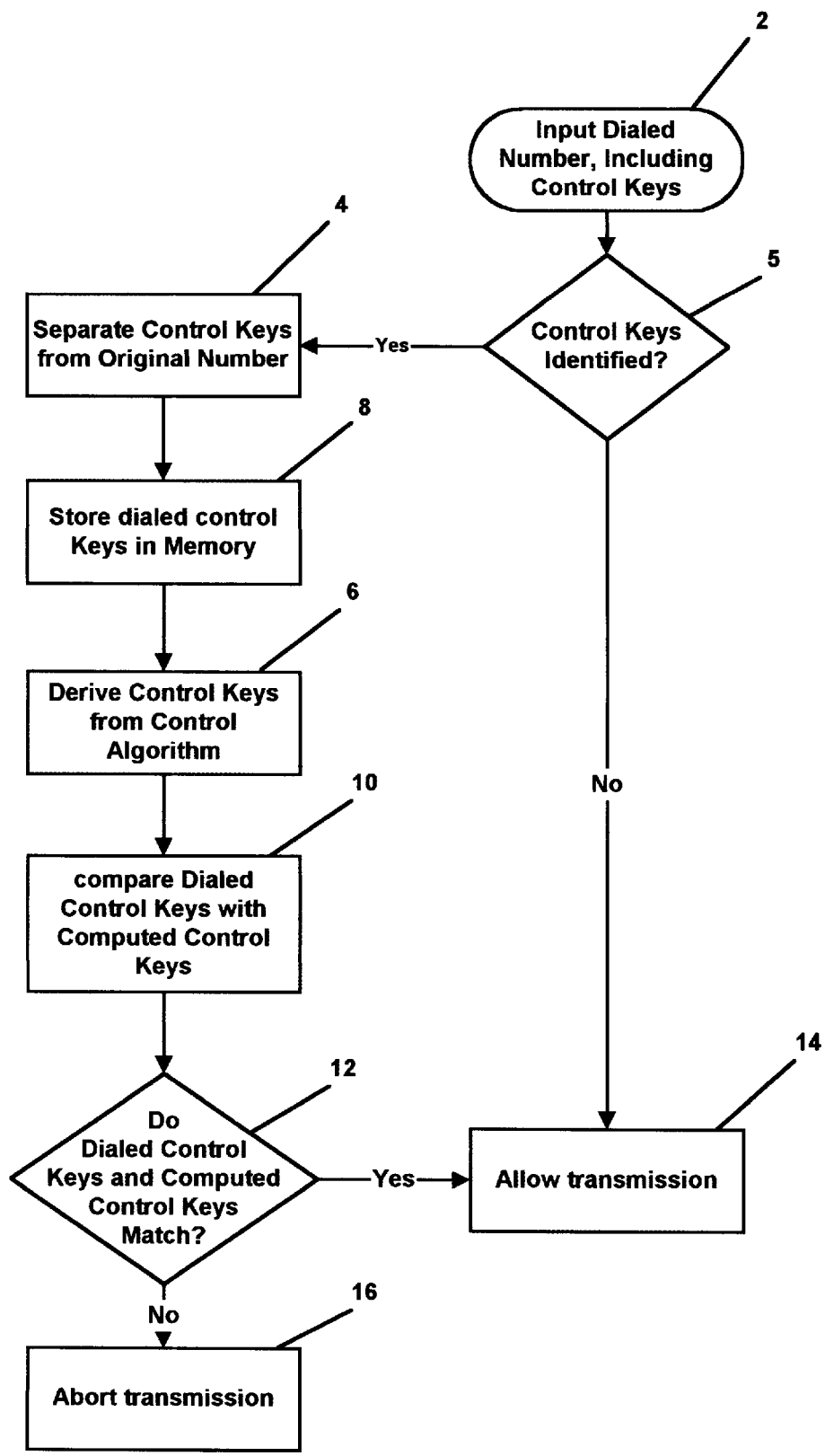
FIG. 1 shows a flowchart of a general control method operative in accordance with the invention.

The invention seeks to manipulate the dialed numbers in a way, that a misdialed number will be identified automatically on completion of the dialing process, and the fax transmission will be intercepted, preferably before the recipient fax machine "reads" or scans the contents of the message. It will be appreciated that the term "number" in this context is used for the sake of convenience since conventional dials nowadays are based on the use of a series of digits that comprise such a telephone "number". However, the invention relates to any series of keys or characters, such as digits, letters and other symbols, that may form a dial series. In order to accomplish this, each telephone number may be augmented by one or two additional "control" key(s)/character(s)/digit(s), being computed by a unique formula or function of the original digits that comprise the original number. For the sake of example, the word "number" and "digit" refers primarily to those commonly appearing in the dial pads or keyboards, namely, the ten basic decimal digits 0, 1, 2, . . . 9. However, as mentioned before, it will be appreciated that any alpha-numeric or other characters can be employed therewith. The Control Key(s) may be placed at a predetermined position, say, as a prefix before the first digit, or as a suffix after the last digit of the original dial number, so as to distinguish the Control Key(s) from the original telephone number. This general method is denominated as step 2 in FIG. 1. The dialed number may be intercepted at some point along the route between the sender and the recipient, may it be at the telephone switch, the fax machine itself, or a designated device inserted between the fax machine and the communication wall plug. In such interception, the Control Key(s) will be distinguished or separated (step 4 in FIG. 1) and extracted from the dialed sequence (herein below—Recomputed Control Key(s)), by re-computing them from the rest of the original number (step 6 in FIG. 1), using the same formula function as the one used formerly to generate the dialed Control Key(s) (herein below—Dialed Control Key(s)) that were distinguished and memorized (step 8 in FIG. 1). Then the Recomputed Control Key(s) may be compared to the Dialed Control Key(s) (step 10 in FIG. 1), and a decision may be taken (step 11 in FIG. 1): if the Recomputed and Dialed Control Key(s) match—the transmission process will be allowed to proceed (step 12 in FIG. 1); otherwise—the transmission will be discontinued and a warning message may be displayed (step 13 in FIG. 1).

It should be noted that the mere use of some control digits for confirmation of numbers, such as "ID numbers" that tag official or state identification certificates, is an already known technique, and is in use for various applications. However, this method was never specifically applied for the validation of, nor for automatic abort of transmission, for providing secure communication in general, and for facsimile transmissions in particular.

The degree of security provided by the present invention, is dependent upon the number of control keys by which the original dial series is augmented. For example, by adding a single digit, between 0 and 10, (whereby the number 10 is replaced by the '#' or the '*' key on the keyboard), to the original telephone number, it is possible to provide virtually full security against the common errors. Such errors include those resulting from one wrongly dialed digit in a sequence of otherwise correct digits, e.g.: 12845 instead of 12345. Another typical error results from interchanging two adjacent digits, e.g.: 12435 instead of 12345, or non-adjacent digits, e.g.: 458769 instead of 456789. A more detailed presentation of the common errors and an algorithm used for the computation of this digit is described hereafter.

Several advantages of the present invention are apparent: The method according to this invention is simple to use. All that is required is to know the control digit(s) of the fax number of the recipient, and to key them together with the original dialed number. A system designed according to the invention present will perform the validation by itself, namely, either confirm the transmission or terminate it. In addition, the method may be easily implemented. The validation may be performed by a digital telephone switch, by a chip added to the fax machine, by a miniature device inserted in the wall plug, or by adequate software where applicable. Furthermore, the method involves the sender only, not the recipient, so the expansion of the usage of the method is not restricted by the formation of groups of common interests. Therefore, the distribution of the method or system according to the invention may start with any number of users, and is not restricted by any upper limit. Moreover, the method may be applied to every fax number or communication address. There is no need to manage databases, or memorize numbers. Updates are never required. In addition, the system or method may be easily designed to be applied with discretion, so that the user will be able to shun the protection in case he finds it unnecessary, or if the transmission is urgent but the Control Key(s) are not available, without making any manipulation prior to dialing. For example, the user may just send the fax without keying the Control Key(s), assuming the risk that the fax transmission will reach the wrong destination (optional step 5 in FIG. 1). Moreover, the method is universal in the sense that the Control Key(s) of a given number anywhere in the world are singular, no matter from where a fax is sent to this number. Thus, once a fax machine is "charged" with the method, secured faxes may virtually be sent securely from that machine to anywhere, while it is not even necessary for the recipient to know his own Control Key(s).

Figure 2:
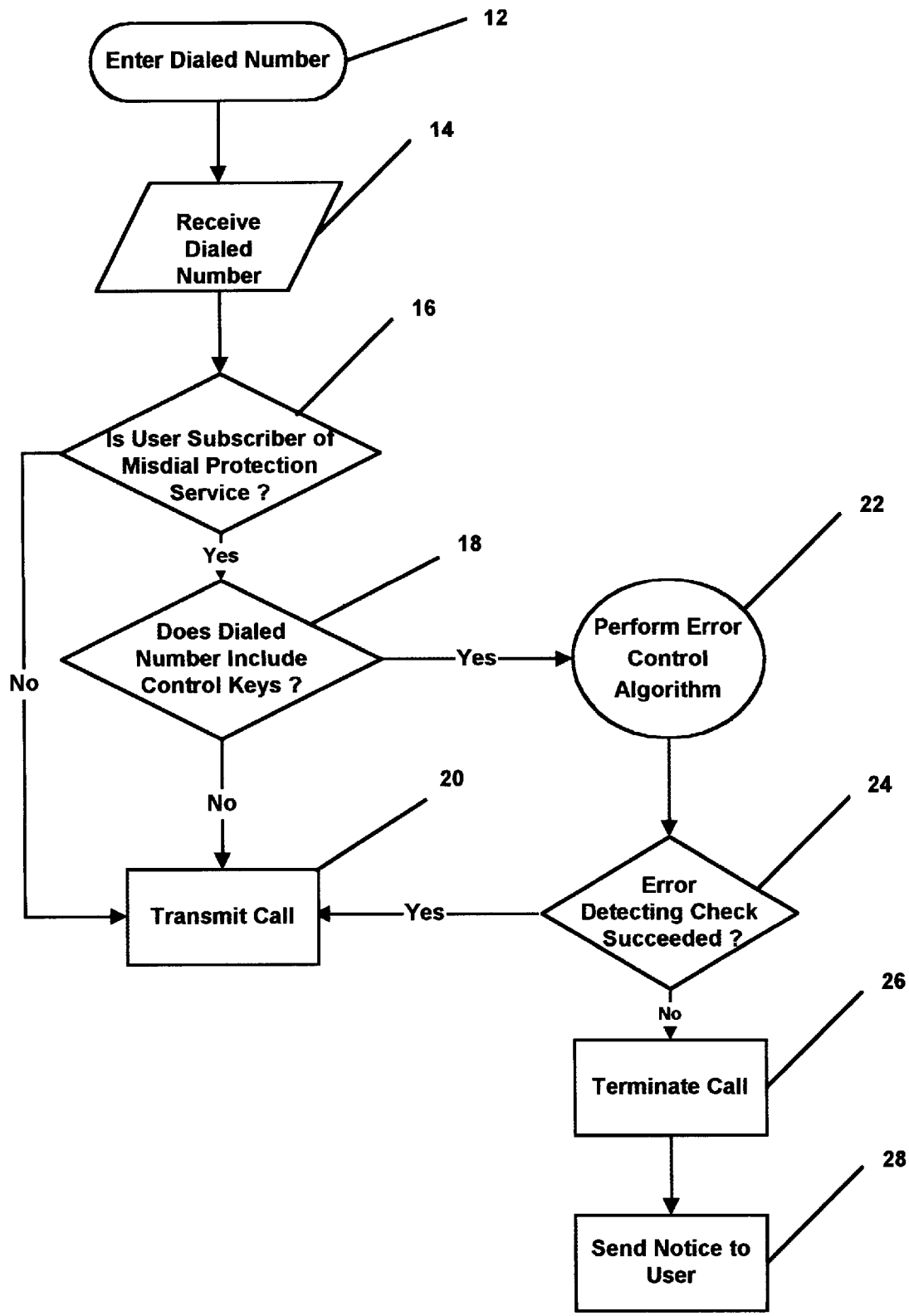
FIG. 2 is a flowchart of a further control method operative in accordance with the invention, applied in conjunction with a central switchboard.

The distribution of information about the Control Key(s) among the general public may eventuate in various ways. It is anticipated that at the first stage, Control Key(s) will be available from central switching services like telephone and telecommunication corporates, "Internet" providers or portals, etc., and that later they will become an integral part of each fax or telephone number or Internet address, as exemplified in FIG. 2. Implementation of an "integrity check" by a telephony vendor or telecommunication provider will take place at either the nearest telephony router, i.e.: the first telephony switch that the dialed number reaches, or at a central office operating as a regional server for the "integrity checks" for all subscribers before the transmission advances to the addressee. Obviously, the reason for that is that a local call can be made to a subscriber which is located at the same telephony switch. When the dialer enters its dial number into the system (step 14), the central switching provider identifies and "perceives" or memorizes the dialed number (step 15). A check for a "misdial protection subscription" may be performed (step 16), whereby the call of a non-subscriber, or without Control Key(s) (step 18) will be allowed without further verification (step 20). The dial of a subscriber with Control Key(s) will be checked according to the general error detecting Control Algorithm (step 22) and the result will be considered (step 24). A right dial will be allowed (step 20) and a wrong dial will result in termination of call (step 26) with optional notice presented to the sender or dialer (step 28).

An algorithm, such as the one shown herein, for the computation of Control Key(s), is simple enough to enable derivation thereof with any pocket calculator or even added as a shortcut standard feature on each pocket calculators, PC, hand watches, and a variety of other devices.

Figure 3:
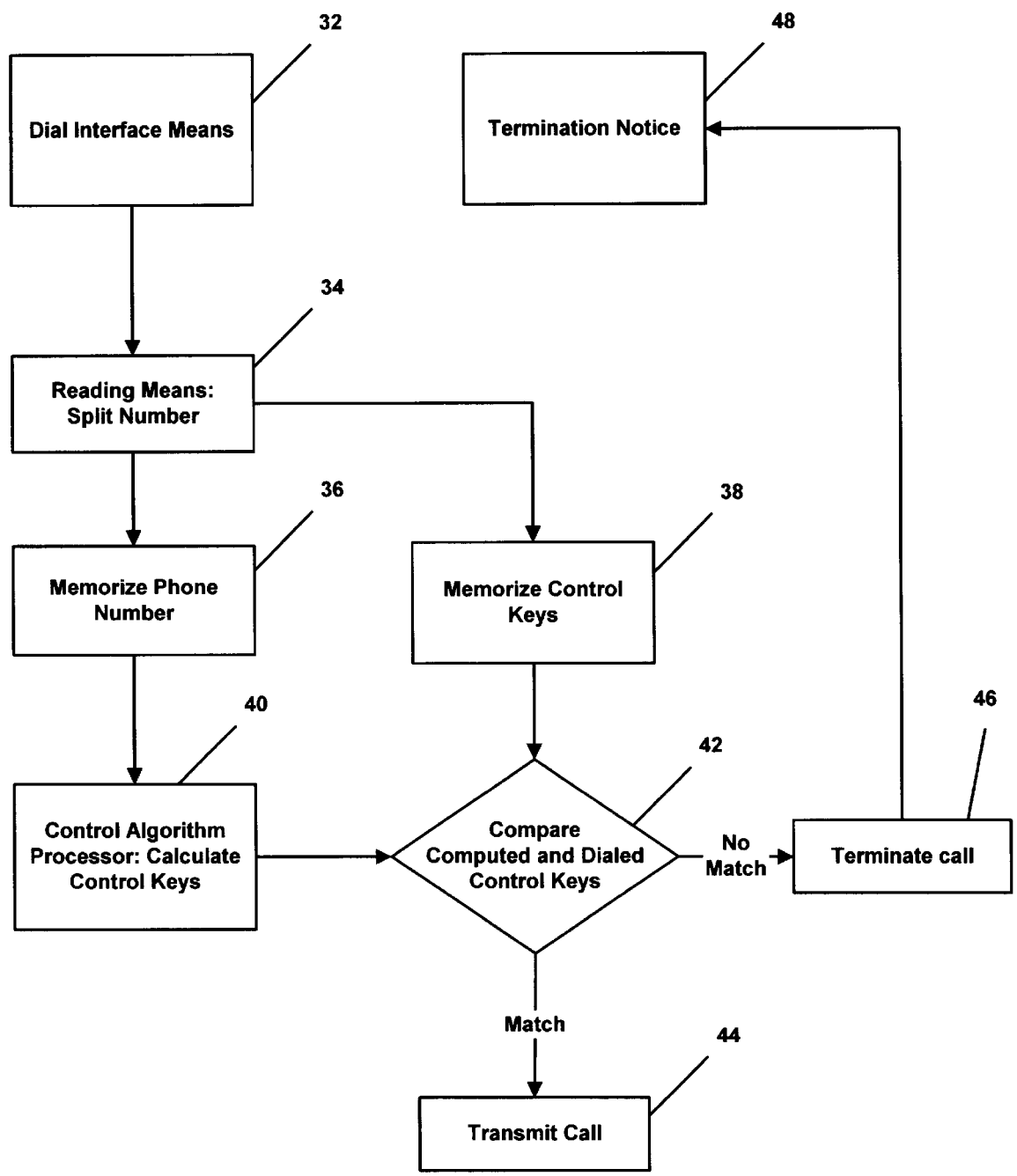
FIG. 3 is a schematic block diagram of apparatus constructed and operative according to one possible embodiment of the invention.

Reference is now made to FIG. 3. According to one preferred embodiment, upon dialing a protected number, the protecting system will automatically follow the steps of, and comprise the elements of:

(i) Once the required telephone number and the control digit(s) have been dialed by some dial interface means 32, the transmission process is temporarily delayed;

(ii) A reading means 34 will read the dialed number, and split it into two constituents: the first comprises all the digits save the first or last digit(s), namely—the original telephone number, and store it in a dial number memory means 36; the second comprises the first or last digit(s), namely—the Dialed Control Key(s) and store it in a dial control memory means 38. Both constituents are thus stored in some temporary memory means;

(iii) A verification means 40 will then apply an algorithm, called hereinafter the "Control Algorithm", to the first constituent of the dialed number, which shall calculate the appropriate digit(s) of the Control Key(s), namely—the Recomputed Control Key(s); and (iv) The resulting Recomputed Control Key(s) derived by the Control Algorithm will then be compared to a comparison means 42 to the stored Dialed Control Key(s) as read in step (ii) and stored in means 38. If both sets of control digits match, the dialed number will be deemed valid, and the fax will then be transmitted through the conventional transmission means 44. If there is no match, the transmission will be terminated through termination means 46, with or without an appropriate notice to the sender by notice means 48, as the designers prefer.

A variety of Control Algorithms may be used to calculate the Control Key(s). The capability and efficiency of such algorithms may differ, depending on the particular algorithm used for their calculation. Following is a description of two error detection codes or Control Algorithms, both based on the same calculation technique, but differing in the number of control digits, and error detection power. These two algorithms are examples for the philosophy behind the error calculation scheme, and do not exclude any other method, which might be based on different functions, or different parameters, keys, characters or number orderings.

Figure 4:
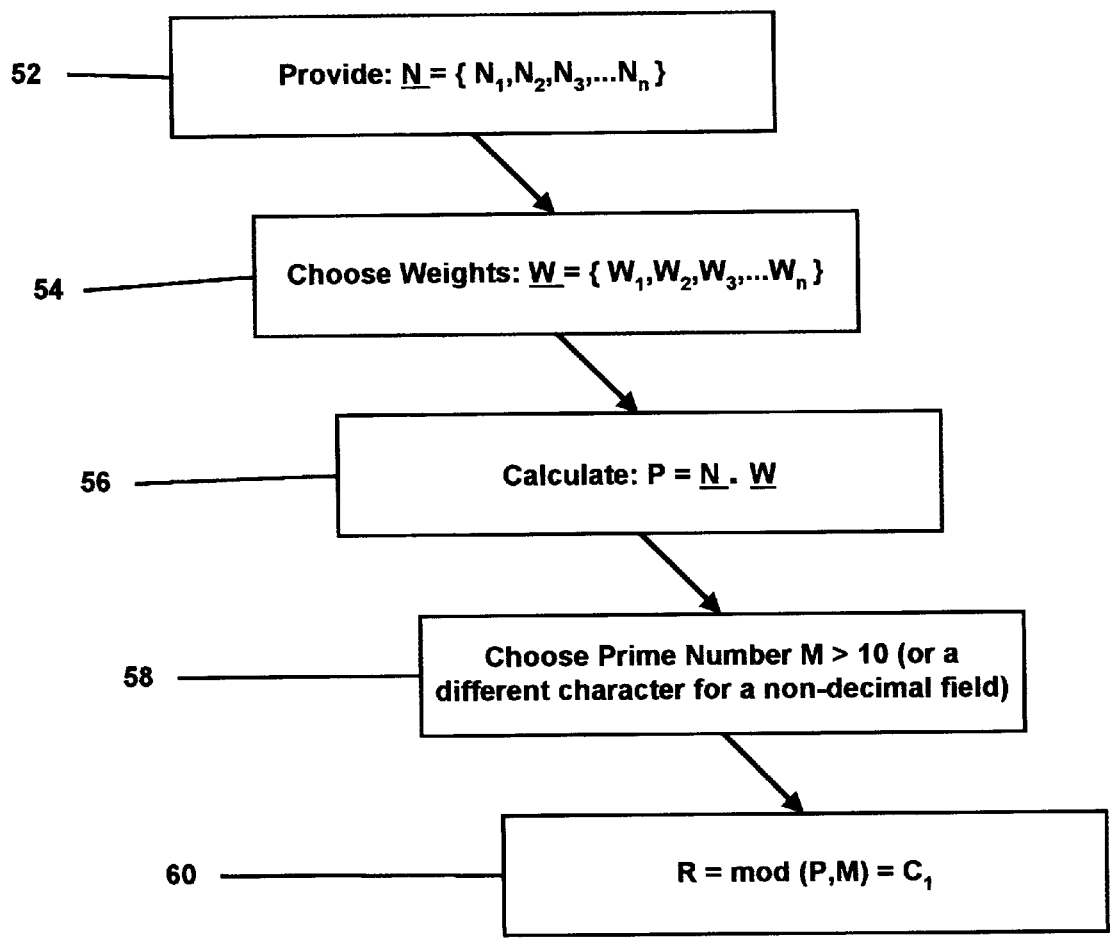
FIG. 4 is a flowchart of a particular example of a control method operative in accordance with the invention.

The calculation of a first control digit (hereinafter—$C_1$) may be accomplished by the following steps. Such a method provides protection against single digit dialing errors, and interchanges between two digits. The method is applied to a given sequence of digits: $d_1, d_2, d_3, d_4, \ldots d_n$, that symbolize a given phone number having "n" digits, as shown in FIG. 4:

Provide a given set of 'n' digits $\{N_i\}$, $i \in (1, 2, \ldots n)$, comprising a phone number or "vector" $\overline{N}$(or 'n' keys comprising a given dial series of keys) (step 52 in FIG. 4).

Choose a set of n "weight" parameters $\{W_i\}$, $(W_i \neq 0)$ (step 54 in FIG. 4). The weight parameters may be chosen arbitrarily, but shall obey some restrictions given below.

Calculate the vector product P, whereby $P=\{W_i\} \cdot \{N_i\} = \overline{W} \cdot \overline{N}$ (step 56 in FIG. 4).

Choose a prime number M, whereby M is greater than 10 for decimal fields of digits, or greater than the number of field characters for non-decimal fields (step 58 in FIG. 4).

Calculate the integer number residue (also called modulus) R, remaining from the division of P by M, namely R=modulus(P/M)=modulus(P, M) (step 60).

R can be used as the first control digit $C_1$

It should be noted that if the number field is based on more than 9 digits, the Control Key(s) may contain either one or two digits or even more. For practical reasons the Control Key(s) may preferably be confined to one single digit. If M=11, the residues may be any number between 0 and 10 (10 comprises two digits in the decimal basis). However, since nowadays most conventional dialing devices are equipped with two additional keys, namely—'*' and '#', one of them may be used for a single digit Control Key for numbers with residue R=10.

Following, is an example of a Control Algorithm for the calculation of a single digit Control Key, capable of detecting the following dialing errors: (i) Dialing a single wrong digit, including a wrong Control Key, (ii) Interchanging any two digits of the original phone number (corresponding to swap of different weights $W_i$'s); (iii) Interchanging the Control Key with some digit $N_i$ of the original phone number.

Based on the principles described above, the single digit Control Key may be obtained by choosing following parameters:

Set M=11

Choose $\{W_i\}=\{1, 2, 3, 4, 5, 6, 7, 8, 9, 10, 1, 2, 3, \ldots\}$

Calculate $P=\{W_i\} \cdot \{N_i\}$

Calculate R=Modulus(P, M)

$C_1$=R. If R=10, denote $C_1$ as * or #

The weight parameters $W_i$ may be chosen in any other order, but the following observations are relevant to a decimal field: Firstly, the residue of $[X \cdot Y]/11$ is equal to the residue of $[X \cdot (Y+11 \cdot n)]/11$. Therefore there is no need to add weight parameters other than the numbers between 1 and 10. If there is a need for more than 10 weight parameters, one must start with a new sequence. It will be noted that most current telephone numbers, including area and country code, contain more than 10 digits. This means that an interchange between two digits that are located 10 places apart from each other, may not be detected by the algorithm. Such an error may nevertheless be regarded as an odd and extremely infrequent incidental dialing error, that practically is not likely to occur at all.

Secondly, the weight parameter $W_i=10$ is preferably kept as far as possible from the single Control Key. In other words, if the Control Key appears after the telephone number, the weight 10 should be far away from the last digit of the telephone number. Vice versa: if the Control Key is placed before the telephone number, weight parameter 10 should be pushed towards the end of the sequence. The reason for this resides in the fact that interchanging the Control Key with a digit having weight parameter $W_i=10$, will always pass the checking algorithm.

Thirdly, the weight parameters sequence need not necessarily contain 10 different keys, and may as well be based on a smaller group of keys. The price for a lesser number of keys is the shortening of the distance between two digits whose interchange cannot be detected by the Control Algorithm, and therefore increase in the likelihood of the occurrence of such undetectable error. However, so long there are still nearly 10 digits, the turning out of such an error may be considered negligible thus ignored. On the other hand, if one omits the weight parameter 10, the second observation described above is entirely extraneous.

As a specific example, reference may be made to current U.S. telephone numbers. U.S. telephone numbers comprise 11 digits: country code (The U.S. country code is universally agreed to be the digit 1), area code (comprising 3 digits), and local telephone number (comprising 7 digits). For the sake of example, an arbitrary number is chosen to be: "1-234-9876540". The Control Key, may be calculated according to the above scheme, whereby the $W_i$'s are denoted by smaller, Italicized digits (the $W_i$'s were chosen in a reversed order), as follows:

$P = 1 \cdot 1 + 2 \cdot 10 + 3 \cdot 9 + 4 \cdot 8 + 9 \cdot 7 + 8 \cdot 6 + 7 \cdot 5 + 6 \cdot 4 + 5 \cdot 3 + 4 \cdot 2 + 0 \cdot 1 = 273$ R=Modulus(273, 11)=9. 9 is the Control Key ($C_1$) for this dial number.

Error detecting examples of the above dial number are as follows: If one dials 1-334-9876540-9 (substituting the original second digit 2 by the digit 3), then P=283, and R=8 which is the Recomputed Control Key. An error will be detected because a the Dial Control Digit 9 will differ from the Recomputed Control Key 8.

If one dials 1-234-9871540-9 (replacing the eighth digit 6 by the digit 1), then P=253, and R=0≠9. Accordingly, an error will be detected.

If one dials 1-239-4876540-9 (interchanging the forth digit 4 with the adjacent fifth digit 9), then P=278, and R=3≠9. Therefore, an error will be detected.

If one dials 1-234-9874560-9 (interchanging the eighth digit 6 with the tenth digit 4), then P=269, and R=5≠9. Thus, an error will be detected.

If one dials 1-234-9876549-0, (interchanging the eleventh digit 0 with the Control Digit 9), the transmission will be terminated, because the Control Digit of 12349876549 is 7 and not 0.

If one dials 1-934-9876540-2, (interchange the second digit 2, which has weight $W_2$=10, with the Control Key 9), the transmission will pass, because the Control Key of 19349876540 is indeed 2. However, since the 2 is very far away from the Control Key(s), such an error is so unlikely, that it may well be overlooked.

Another example of a Control Algorithm, somewhat analogous to the former examples but providing adequate protection against two errors in a single dial, and requiring two keys for the Control Key(s), will now be described.

The calculation of the second digit of the Control Key(s) may rely on the same method described above for calculating the first control digit. Yet, a different weight parameters sequence $\{G_i\}$ is employed therefor. The $G_i$'s shall follow the observations applied to the $W_i$'s, but will also comply with the following relation:

for each i: $W_i + \alpha G_i$ = Constant, wherein:

$\alpha = \pm 1$, and Constant ≠ k·11 for k=0, 1, 2, 3, . . .

This relation states simply that, either the sum of $W_i$ and $G_i$, or their difference, must be a constant, and this constant shall be neither zero, nor divisible by 11. An equivalent statement is, that the $G_i$ and $W_i$ sequences must be identical, yet they are either shifted by a constant value relative to each other (for $\alpha=-1$), or they proceed in opposite directions (for $\alpha=+1$). Herein below, this relation shall be called "the Dual Sequence Rule".

The two weight vectors $\{W_i\}$ and $\{G_i\}$ may be used to calculate two digits that comprise two control digits of the Control Key(s). The two control digits must be placed in a uniquely defined order among themselves, in addition to their known ordering with respect to the dial number. When the Control Algorithm is applied, the transmission of the fax shall be enabled only when both digits of the Computed Control Key(s) conform to those of the Dialed Control Key(s). It may be shown that the above described algorithm is capable of detecting two errors in telephone numbers of any length, with a single, negligible, exception, as described below.

As a result of the Dual Sequence Rule, the observations for the choice of $W_i$ given for the single digit Control Key, are slightly modified. Recalling that with the single digit Control Key it was allowed to use only weights $W_i$ between 1 and 10, as the weight zero was not permitted (due to the insensitivity of weight zero to any error). Now, since the two different sequences of weight functions that are used, are connected by the Dual Sequence Rule, either $W_i$ or $G_i$ may also be zero, so that each "weight" sequence may contain 11 different digits instead of 10. Because of the Dual Sequence Rule, the two weights may never zero simultaneously, so that an error in a digit having weight 0 in one function, will be detected by the other function, which necessarily differs from 0. The two digit Control Algorithm may thus detect any interchange of two digits in any sequence having length of up to 11 digits, instead of 10 in the single digit Control Algorithm. It will fail only if two digits, exactly 11 locations apart, are interchanged, because both digits will have the same weight parameters.

In order to demonstrate the usefulness of the two digit Control Algorithm, one may notice that all telephone numbers within the U.S. conventionally comprise 10 digits, as in the example shown above. Telephone numbers outside the U.S. conventionally have 11 digits. Therefore, all faxes sent within the U.S. or to the U.S. from abroad are not only fully protected against two errors, but also against any interchange of two digits. At present, most of the telephone numbers throughout the world usually include less than 11 digits (including country and area codes) so that the above advantages apply to most countries as well. For longer numbers, the only difference is that there is no full protection against interchanges between two digits which are just 11 locations apart, but this is apparently a negligible issue.

To summarize, the two digit Control Algorithm presented, is a very powerful tool, providing full protection against any single or double error for numbers of any length, full protection against interchanges of any two digits which are not exactly 11 locations apart. Like the single digit Control Algorithm, there is also the benefit of an error detection capability of more than two errors, but with a confidence of error tracking of about 99%.

The examples of the Control algorithm presented above are primarily addressed to cope with numerical dials, like telephone or fax numbers. However, the expanding usage of digital data transmission (including text, graphic, audio, video or any other types of transmitted files), rises address verification problems similar to those confronted when facsimile telecommunication is used. There is one distinguishing element characterizing "computer" communication addresses, namely, the prevalent use of alpha-numeric characters, rather than just numerical digits. For example, the most common "Internet E-mail" addresses, or address strings, contemporarily compose letters, digits and some universal typing characters found on common keyboards, like '@','#','$','%','&','*', and '−'. It will be appreciated that the use of more than 10 characters means, from algebraic point of view, that the relevant "real numbers field" expands to N characters, wherein N>10; Although the field ceases to be decimal, all "real numbers" field rules continue to prevail. Accordingly, the same principles that allowed application of the Control Algorithm for decimal digits field may be correspondingly applied. Moreover, the application may be administered with decimal calculations —for ease of their conduct—despite the expanded field, with adequate modifications as exemplified below.

Referring to the common characters contemporarily used, the original numerical set ranging from 0 to 9, is expanded by further letters and characters. One may designate each additional letter with a decimal value greater than 9. Thus, the value 10 may be assigned to designate the first Latin letter "A", the value 11 to the second Latin letter "B", and so forth up to 35 to the last, $26^{th}$ letter, "Z". A decimal equivalents vector $\{N_I\}$ may thus be created for a string of address keys. The weight vector $\{W_I\}$ may be correspondingly expanded to include "weight" values ranging from 1 to 36.

For each address string, may it be composed of digits only, letters only, or any combination thereof; the vector product $P=\{W_i\}\cdot\{N_i\}$ of the decimal equivalents vector and the weight vector may be calculated. In a corresponding fashion, it is possible to calculate the residue R for this vector product P, divided by the first prime number M that is greater than the largest decimal value involved. In the above example the largest decimal value involved is 35 and therefore the first prime number M is 37. The resulting residue R may be the Control Key $C_i$. The Control key may be used in its decimal equivalent, namely—as a number between 0 and 35, or may be converted back to one of the 36 characters that are represented by such values. In other words, if the residue is a number between 0 and 9, this number will be the Control Key. If the residue is a number between 10 and 35, the equivalent letter—"A" for 10, "B" for 11, etc., will form the Control Key. If the residue equals 36, a special convention is needed, since no letter is assigned to this number. In such a case one can use the same convention which was used for the decimal field, wherein '*' or '#' denoted the residue 10. In the present field, the '*' or '#' sign may form the Control Key for the residue 36.

Based on the former principles, the expanded Control Algorithm provides full protection against any single typing error ("dialing" may now be inappropriate to describe the keystroke), including any interchange between two characters (whether digits or letters). It will be noted that since the combined set of digits and letters now contains 37 different characters instead of 10, the probability of making two or more errors which will match with a given, single, code, is no more than 1/36 (less than 3%). The use of a single character code may satisfy reasonable protection requirements, yet the expansion to two characters is straightforward.

It should be noted that the use of capital letters in the above example was brought about only for the sake of exemplifying a generalized Control Algorithm. It may be recommended, however, that the Control Algorithm shall become "case insensitive", so that the number 10 is assigned to both letters "A" and "a", 11 to both "B" and "b", and so on. It should be noted however, that the Control Algorithm may cope with case-sensitive sets as well: all that is required is to expand the key set to 61 characters (by designating "a" to 36, "b" to 37, etc. up to 61 for "z"), and base the calculation on an appropriate modulus. However, since such an expanded set includes 62 different characters (including 0), the nearest prime number, on which the calculation of the protection code may be based, is 67, so that there are 5 potential residues —62, 63, 64, 65,and 66 which have no equivalent letters or numbers. In order to avoid the addition of 5 dummy characters like '*', '#','$', that are needed to represent the residues between 62 and 66, it may be preferable to leave the Control Keys in form of decimal number values (two digits), instead of converting them back to letters when the residue is greater than 9.

The Control Key(s) of a given telephone number must be singularly unique, no matter if the fax is sent to the recipient from the same area, from a different area in the same country, or from a different country altogether. The addressee in all these cases is the same but the actual dialed numbers differ in each case. Thus in each case a different control number might be theoretically required. Such a situation might render the whole concept herein useless in many respects, unless the Control Algorithm always takes into account the fill telephone number, including area and country code, no matter if they are dialed or not. To that end, the protective system may be designed in such a way, that it will always request in its initial setting to enter the country code and the area code of the location of the fax machine which sends the message. When a fax is sent within the same area, the omitted area and country code of the recipient being identical to those of the sender—will be added automatically by the Control Algorithm to the process of computing the Control Key(s). Similarly, if a fax is sent to a different area, but within the same country, the Control Algorithm will add the omitted country code only. The end result is that the Control Algorithm is applied uniquely to the full telephone number, including area and country code, no matter whether they are dialed or not.

A telephone number within the same area code may be dialed directly without the requirement to dial or enter the area and country codes, while the Control Algorithm may be applied to the full sequence of the dialed digits, together with the area and country codes that are added, as described above. However, if one dials to a different area or country, the dialing person is often required to dial a few further digits prior to the actual telephone number (prefixes), in order to access the different area or to contact a long distance telephone company or get access to some dialing service. These additional digits must be excluded from the Control Algorithm, since they differ from one company or area to another, and should be considered as "irrelevant". Therefore, there is a need to distinguish between the actual telephone number and Control Key(s)—to which the Control Algorithm is to be applied, and the irrelevant access digits— which must be ignored by the Control Algorithm.

One possible way to distinguish the relevant from the non relevant portions of the number to be dialed, may be provided by the adding of a buffering key as a further "Control Key". For instance, for a second Control Key $C_2$, the otherwise not used # and * characters may be chosen as a buffer key to be placed between the irrelevant prefix and the relevant dialing sequence. For example, if the prefix at some place is 00122, and the telephone number, including country and area code is given as 59-2-123-4567, then $C_1$=R=4, and the fully protected dialed number shall be 00122-*4-59-2-123-4567. The system may then be designed to identify all the digits prior to the * (or #) character as digits that must be ignored for the sake of the Control Algorithm, and will also identify the * (or #) and the following digit as the Control Key(s). Another possible way, which is less reliable, is to rely on a standard order by which the dial number and the Control Key(s) are always dialed.

Under certain circumstances, a person may want to bypass the dialing protection, even when his fax device is furnished with the protective function. One way of providing this is by designing the Control Algorithm to recognize that the dial protection is not required if no # or * character appears in the actually dialed sequence. Another possible way is by limiting the dial time for the dial number sequence and/or the Control Key(s) sequence.

It will be appreciated that the Control Algorithm may be implemented in various ways. For example, three practical fashions will now be noted. The first fashion is an implementation by the telephone corporate or the telecommunication or switching provider, as an extra service to its customers. The second fashion is a omputerized hardware device, that may be added to the fax machine itself or the switchboard on site or adequate software—where applicable—such as when a computer fax modem or a router is involved. The third fashion is similar to the second, but the implementation will be accomplished on a programmable external device, which will be inserted between the fax-machine/switchboard/PC-modem and the wall-plug/external line(s).

Figure 5:
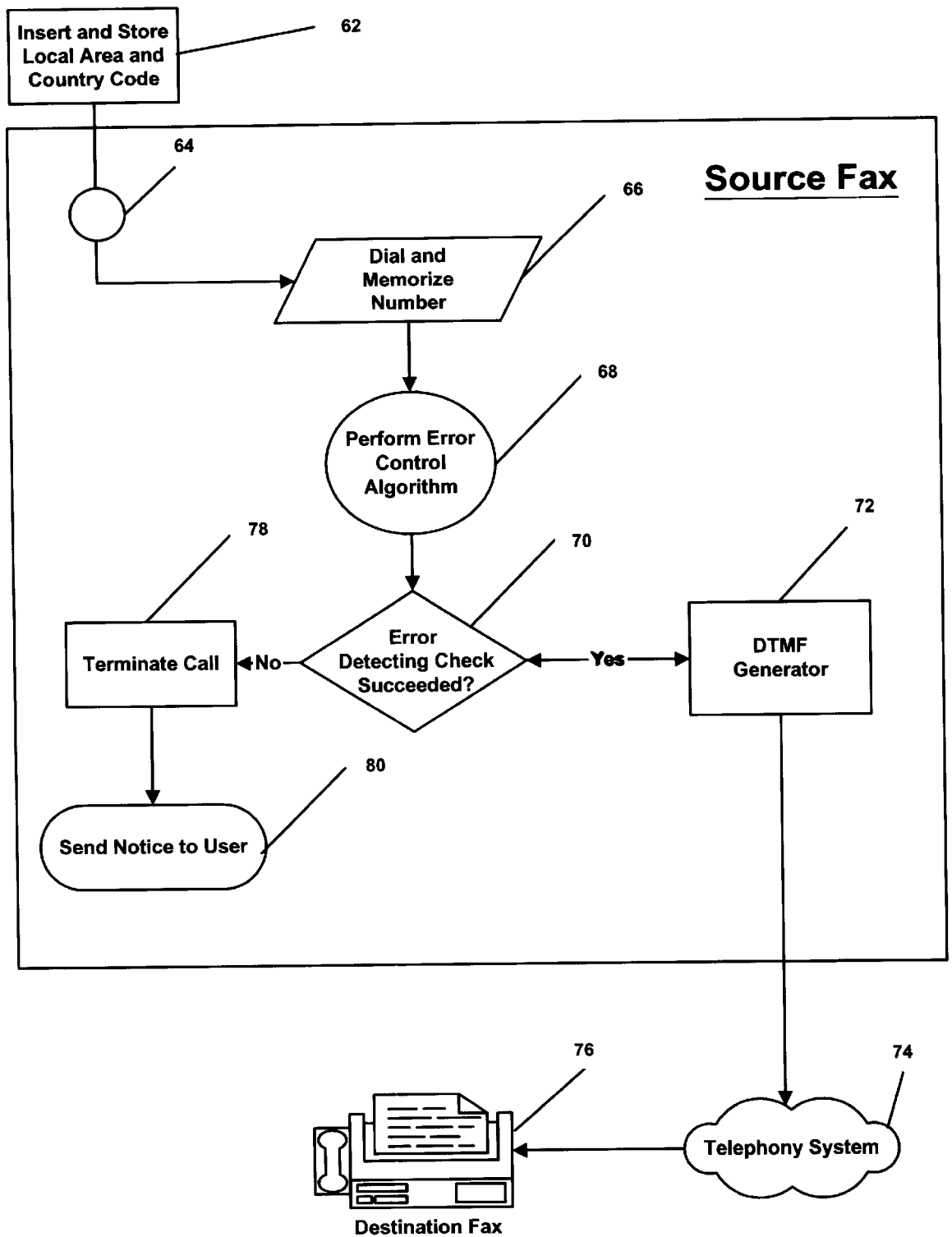
FIG. 5 is a schematic block diagram of facsimile apparatus constructed and operative according to another possible embodiment of the invention.

Reference is now made to FIG. 5, in which the implementation on the fax machine (or analogous dialing means)

is essentially the same as via the telephony vendor, except that the whole integrity check device is integrated on the fax machine itself Upon dialing the target telephone number into interface means 62, a special electronic circuit 64 will be activated, which temporarily memorizes the dialed number in means 66 and implements the "integrity" check or the error Control Algorithm 68 before letting the dialing through. Again, if the result of the check 70 shows no dialing error, the transmission will start by the Digital Tone Multiple Frequency ("DTMF") generator 72 via the general telecommunication system 74 to the destination fax 76. If not, the transmission will be blocked by blocking means 78, and preferably a warning message will appear on the dialing screen of the fax by warning display means 80. The main difference between this method and the former is that the integrity check is performed even before the connection to the telephone network is established, so that the telephone vendor is not involved in the procedure. This implementation however can be established on new fax machines only, or after configuration of the dialing units into old fax machines is modified accordingly.

Figure 6:
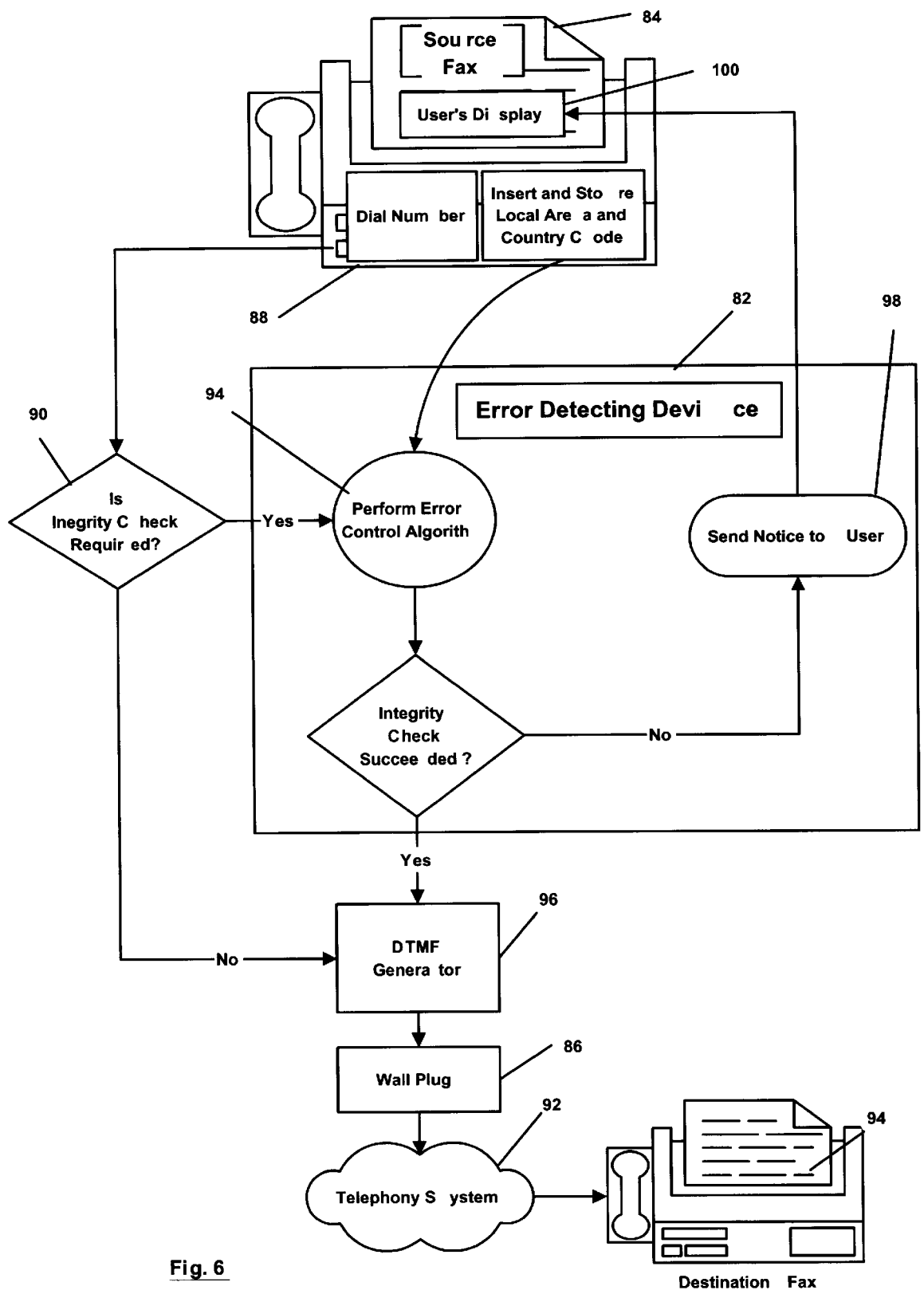
FIG. 6 is a schematic block diagram of facsimile apparatus constructed and operative according to a further possible embodiment of the invention.

Another method of configuration is a derivative of the second one, the only difference is that it uses an external device instead of a fax integrated unit, as best seen in FIG. 6. The advantage of this implementation is that it may be applied to any conventional unmodified fax machine (or analogous dialing apparatus) which is already in use. This device can be used also for regular telephone calls, or modems. The external device will be placed between the fax machine 84 (or any other dialing device) and the wall plug 86. The device will intercept the DTMF signals of the fax DTMF generator 88 and will allow the continuation of the call only if the integrity check succeeds. Device 82 may be programmable, so that it will be able to identify the local country (or state) code, and the local area code, needed to complete the missing numbers when dialing to the same country or area as described above. The programming shall be effected via special codes inserted by the fax machine to which the device is connected. If the user dials no integrity check request indication (control digits) as identified by integrity require means 90, the call is transmitted right away via the telephony system 92 to the destined fax 94. If there is an integrity check request, the external device 82 performs the integrity check by integrity verifier means 94. In case the integrity check succeeds, it erases the indication and integrity check digits, and the destination number is transferred to the DTMF generator 96. If the check fails, the integrity check circuit will send an appropriate message by warning means 98 to the fax machine dialing screen 100.

While the invention has been described with respect to specific embodiments, it will be appreciated that many variations, modifications and other applications of the invention may be made.

With the foregoing description, it is believed apparent that the present invention enables the attainment of the objects initially set forth herein.

It should be understood, however, that the invention is not intended to be limited to the specifics of the illustrated or described embodiments or methods, but rather is defined by the accompanying claims.

what is claimed is:

1. A method for the verification of the connection via telecommunication comprising the steps of:
   (a) computing control key(s) by a control algorithm applied to the series of dial key(s) that conventionally designate the recipient communication address;
   (b) when dialing said dial key(s) for establishing comunication with said recipient, dialing said control key(s);
   (c) reading and recording the dialed dial key(s) and the dialed control key(s), as dialed in step (b);
   (d) recomputing control key(s) by applying said control algorithm to the dialed dial key(s) recorded in step (c);
   (e) comparing said recomputed control key(s) re-computed in step (d) to said dialed control key(s) recorded in step (c); and
   (f) allowing establishing or continuation of the communication with the recipient if there is a match between said dialed control key(s) and said recomputed control key(s), and aborting such communication in the absence of such match.

2. A method as in claim 1, wherein said connection is set for facsimile transmission.

3. A method as in claim 1, wherein said connection is set for data signal modem communication.

4. A method as in claim 1, wherein the control key(s) dialed in step (b) are located in a predetermined location with reference to the dial key(s).

5. A method as in claim 4, wherein said predetermined location of the control key(s) is before the first dial key or after the last dial key.

6. A method as in claim 1, wherein said control key(s) comprise key(s) that are different from the key(s) that may comprise said dial key(s).

7. A method as in claim 1, wherein the dial is intercepted at some point along the route between the sender and the recipient.

8. A method as in claim 7, wherein said point of interception is at the telephone switch, in the transmitting-device/facsimile-machine used for transmitting through the dial communication, or in a designated device inserted between said transmitting-device/facsimile-machine used and the communication wall plug.

9. A method as in claim 1, wherein said control key(s) are computed and provided to the public at large by central switching services, telephone and telecommunication providers, Internet providers or portals, and the like.

10. A method as in claim 1, wherein said control key(s) are systematically provided as an integral part of each facsimile or telephone number or Internet address.

11. A method as in claim 1, wherein implementation of an integrity check in which said method is applied by a telephony vendor or telecommunication provider takes place at either the nearest telephony router, or at a central switch operating as a regional server for said integrity checks for subscribers before their transmission is forwarded to the addressee.

12. A method as in claim 1, wherein said control algorithm comprises the following:
   (a) considering said series of dial key(s) as constituting a sequence of n key(s): d1, d2, d3, d4, . . . dn, in a vector form $\overline{N}=\{N_i\}$, whereby $i \epsilon (1, 2, \ldots n)$;
   (b) choosing a set of n weight parameters $\{W_i\}$, whereby $(W_i \neq 0)$, in a vector form $\overline{W}=\{W_i\}$, whereby $i \epsilon (1, 2, \ldots n)$;
   (c) calculating the vector product $P=\{W_i\} \cdot \{N_i\}=\overline{W} \cdot \overline{N}$;
   (d) choosing a prime number M that is greater than 10 for decimal fields of dial keys, or greater than the number of field characters for non-decimal fields of dial keys; and
   (e) calculating the integer number residue "modulus" R, remaining from the division of P by M, and using R as the first control key.

13. A method as in claim 12, wherein said field of dial keys is decimal, said M equals 11, and the residue R is any number between 0 and 10.

14. A method as in claim 13, wherein one of the characters—'*' or '#' is used to represent a single control key denoting the residue R=10.

15. A method as in claim 13, wherein calculation of a second control key comprises the following:
   (a) choosing a set of n weight parameters $\{G_i\}$ in a vector form $\overline{G}$, whereby
   $i \in (1, 2, \ldots n)$ and for each i: $W_i + \alpha G_i =$ Constant, wherein $\alpha = +1$, Constant $\neq k11$ for $k=0, 1, 2, 3, \ldots$, and either $G_i \neq 0$ and/or $W_i \neq 0$;
   (b) calculating the vector product $P' = \{G_i\} \cdot \{N_i\} = \overline{G} \cdot \overline{N}$;
   (c) choosing a prime number M' that is greater than 10 for decimal fields of dial keys, or greater than the number of field characters for non-decimal fields of dial keys; and
   (d) calculating the integer number residue "modulus" R', remaining from the division of P' by M' and using R' as the second control key, whereby the first and second control keys are placed in a uniquely defined order among themselves, in addition to their known ordering with respect to the dial key(s).

16. A method as in claim 1, wherein said control algorithm is performed, in respect with the dial key(s) and all relevant prefixes/additions used for designating local, regional, country or other parameters that conventionally represent communication path or route, irrespective of the actual dial of such prefixes/additions.

17. A method as in claim 1, wherein access key(s) that differ from one switchboard, switch service supplier or access provider to another, are deemed irrelevant and excluded from the dial key(s) that are considered by the control algorithm.

18. A method as in claim 1, wherein control key(s) are distinguished from the dial key(s) by means of a buffering key added there between as a further control key.

19. A method as in claim 1, wherein the dialing protection provided by the method may be bypassed or shunned.

20. A method as in claim 19, wherein said bypass or shun is provided for when the control key(s) are not dialed or when buffer key(s) that form part of the control key(s) are not dialed.

21. A method as in claim 1, wherein a warning message or alarm is activated in an appropriate display or alarm means, when communication is aborted in step (f), notifying of such abort.

22. An apparatus for verification of the connection established by telecommunication through the dial of dial key(s) and control key(s), comprising:
   (a) reading means for reading key(s) dialed or otherwise entered into said apparatus for establishing communication;
   (b) separation means for distinguishing dial key(s) from dialed control key(s) read by said reading means;
   (c) memory means for storing said dial key(s) and said dialed control key(s) separated by said separation means;
   (d) computing means for computing recomputed control key(s) by applying a control algorithm to the dial key(s) stored in said memory means;
   (e) comparison means for comparing said dialed control key(s) to said recomputed control key(s);
   (f) verification means allowing establishing or continuation of the communication with the recipient if there is a match between said dialed control key(s) and said recomputed control key(s), and aborting such communication in the absence of such match.

23. An apparatus as in claim 22, implemented at a switchboard or at a communication switch.

24. An apparatus as in claim 22, implemented as a hardware element in a facsimile, data signal modem or a router.

25. An apparatus as in claim 22, implemented as a software element in a facsimile, data signal modem or a router.

26. An apparatus as in claim 22, comprising an external device, that may be inserted between a facsimile-machine, a switchboard or a data-signal-modem and the wall-plug or external communication line(s).

27. An apparatus as in claim 22, further comprising warning display or alarm means for signaling the abort of communication.

28. An apparatus as in claim 22, wherein said verification means allow establishing or continuation of the communication with the recipient if no control key(s) or no buffer key(s) forming part of the control key(s) are dialed.

29. An apparatus as in claim 22, wherein said separator means distinguishes said dial key(s) from said dialed control key(s) by the location of key(s) with respect to each other or with respect to buffer key(s).

30. An apparatus as in claim 22, wherein said separator means distinguishes said dial key(s) from said dialed control key(s) by identifying control key(s) that are different from the key(s) that may comprise said dial key(s).

31. An apparatus as in claim 22 implemented at the telephone switch, in the transmitting-device/facsimile-machine used for transmitting through the dial communication, or in a designated device inserted between said transmitting-device/facsimile-machine used and the communication wall plug.

32. An apparatus as in claim 22, implemented at either the nearest telephony router, or at a central switch operating as a regional server for applying said verification for subscribers before their transmission is forwarded to the addressee.

33. An apparatus as in claim 22, wherein said control algorithm comprises provision of the following:
   (a) considering said dial key(s) as constituting a sequence of n key(s): $d_1, d_2, d_3, d4, \ldots d_n$, in a vector form $\overline{N} = \{N_i\}$, whereby $i \in (1, 2, \ldots n)$;
   (b) choosing a set of n weight parameters $\{W_i\}$, whereby $(W_i \neq 0)$, in a vector form $\overline{W} = \{W_i\}$, whereby $i \in (1, 2, \ldots n)$;
   (c) calculating the vector product $P = \{W_i\} \cdot \{N_i\} = \overline{W} \cdot \overline{N}$;
   (d) choosing a prime number M that is greater than 10 for decimal fields of dial keys, or greater than the number of field characters for non-decimal fields of dial keys; and
   (e) calculating the integer number residue "modulus" R, remaining from the division of P by M, and using R as the first control key.

34. An apparatus as in claim 33, wherein said field of dial keys is decimal, said M equals 11, and the residue R is any number between 0 and 10.

35. An apparatus as in claim 33, wherein one of the characters—'*' or '#' is used to represent a single control key denoting the residue R=10.

36. An apparatus as in claim 33, wherein calculation of a second control key comprises the provision of the following:
   (a) choosing a set of n weight parameters $\{G_i\}$ in a vector form $\overline{G}$, whereby
   $i \in (1, 2, \ldots n)$ and for each i: $W_i + \alpha G_i =$ Constant, wherein $\alpha = \pm 1$, Constant $\neq k\cdot 11$ for $k=0, 1, 2, 3, \ldots$, and either $G_i \neq 0$ and/or $W_i \neq 0$;
   (b) calculating the vector product $P' = \{G_i\} \cdot \{N_i\} = \overline{G} \cdot \overline{N}$;
   (c) choosing a prime number M' that is greater than 10 for decimal fields of dial keys, or greater than the number of field characters for non-decimal fields of dial keys; and (d) calculating the integer number residue "modulus" R', remaining from the division of P' by M' and using R' as the second control key, whereby the first and second control keys are placed in a uniquely defined order among themselves, in addition to their known ordering with respect to the dial key(s).

37. An apparatus as in claim 33, wherein said control algorithm is performed, in respect with the dial key(s) and all relevant prefixes/additions used for designating local, regional, country or other parameters that conventionally represent communication path or route, irrespective of the actual dial of such prefixes/additions.

38. An apparatus as in claim 33, wherein access key(s) that differ from one switchboard, switch service supplier or access provider to another, are deemed irrelevant and excluded from the dial key(s) that are considered by the control algorithm.

* * * * *